(12) United States Patent
Achterberg et al.

(10) Patent No.: US 12,502,760 B2
(45) Date of Patent: Dec. 23, 2025

(54) COMPACT POWERED WRENCH

(71) Applicant: Black & Decker Inc., New Britain, CT (US)

(72) Inventors: Nicholas E. Achterberg, New Freedom, PA (US); Axel Bela Lehovetzki, Seine Saint Denis (FR); Thomas S. Wolf, Perry Hall, MD (US); Phillip O. Reed, Sheffield (GB); Chun-Chiang Liu, Taichung (TW)

(73) Assignee: BLACK & DECKER INC., New Britain, CT (US)

( * ) Notice: Subject to any disclaimer, the term of this patent is extended or adjusted under 35 U.S.C. 154(b) by 513 days.

(21) Appl. No.: 17/672,292

(22) Filed: Feb. 15, 2022

(65) Prior Publication Data
US 2022/0266439 A1  Aug. 25, 2022

Related U.S. Application Data

(60) Provisional application No. 63/153,758, filed on Feb. 25, 2021.

(51) Int. Cl.
*B25F 5/02* (2006.01)
*H01M 50/247* (2021.01)
*B25B 21/00* (2006.01)

(52) U.S. Cl.
CPC ............ *B25F 5/02* (2013.01); *H01M 50/247* (2021.01); *B25B 21/004* (2013.01); *H01M 2220/30* (2013.01)

(58) Field of Classification Search
None
See application file for complete search history.

(56) References Cited

U.S. PATENT DOCUMENTS

| | | |
|---|---|---|
| 4,006,334 A | 2/1977 | Robotham et al. |
| 4,882,458 A | 11/1989 | Berg et al. |
| 4,910,365 A | 3/1990 | Kuo |
| 4,941,259 A | 7/1990 | Wolf |
| 4,969,266 A | 11/1990 | Poganitsch |
| 4,974,475 A | 12/1990 | Lord et al. |
| 5,058,463 A | 10/1991 | Wannop |
| 5,138,243 A | 8/1992 | Kress et al. |
| 5,170,851 A | 12/1992 | Kress et al. |
| 5,207,129 A | 5/1993 | Fossella |

(Continued)

FOREIGN PATENT DOCUMENTS

| | | |
|---|---|---|
| CN | 209682063 U | 11/2019 |
| CN | 210042388 U | 2/2020 |

(Continued)

OTHER PUBLICATIONS

EP EESR dated, Jun. 24, 2022 in corresponding EP application No. 22158423.8.

*Primary Examiner* — Tanzim Imam
(74) *Attorney, Agent, or Firm* — Womble Bond Dickinson (US) LLP

(57) ABSTRACT

A wrench including a tool head including a tool output member. The wrench also includes a motor configured to selectively drive the output member and a battery assembly. The battery assembly includes a battery cell and the battery cell provides power to the motor. A support tube surrounds at least a portion of the motor and a portion of the battery assembly. A handle surrounds the support tube.

19 Claims, 15 Drawing Sheets

(56) References Cited

U.S. PATENT DOCUMENTS

| | | |
|---|---|---|
| 5,251,706 A | 10/1993 | Evans |
| 5,311,949 A | 5/1994 | Chapin |
| 5,448,931 A | 9/1995 | Fossella et al. |
| 5,571,971 A | 11/1996 | Chastel et al. |
| 5,713,250 A | 2/1998 | Hendricks et al. |
| 5,769,211 A | 6/1998 | Manna et al. |
| 5,945,753 A | 8/1999 | Maegawa et al. |
| 5,992,540 A | 11/1999 | Smolinski et al. |
| 6,070,499 A | 6/2000 | Wisbey |
| 6,311,584 B1 | 11/2001 | Chu |
| 6,455,950 B1 | 9/2002 | Nishitani et al. |
| 6,457,386 B1 | 10/2002 | Chiang |
| D477,202 S | 7/2003 | Duennes |
| 6,669,501 B2 | 12/2003 | Serizawa et al. |
| 6,752,048 B1 | 6/2004 | Chiang |
| 6,915,721 B2 | 7/2005 | Hsu et al. |
| 6,923,268 B2 | 8/2005 | Totsu |
| 6,945,981 B2 | 9/2005 | Donofrio et al. |
| 7,187,518 B2 | 3/2007 | Hong et al. |
| 7,735,398 B2 | 6/2010 | Hsu et al. |
| 7,776,027 B2 | 8/2010 | Manna et al. |
| 7,823,486 B2 | 11/2010 | Wise |
| 7,836,968 B2 | 11/2010 | Steverding et al. |
| 7,883,465 B2 | 2/2011 | Donofrio et al. |
| 7,990,005 B2 | 8/2011 | Walter et al. |
| 8,230,942 B2 * | 7/2012 | Steverding .............. B25B 21/00 173/1 |
| 8,444,629 B2 | 5/2013 | Manna et al. |
| 8,546,709 B2 | 10/2013 | Yeh |
| 8,643,237 B2 | 2/2014 | Miyaji et al. |
| D728,337 S | 5/2015 | Henssler et al. |
| 9,023,071 B2 | 5/2015 | Miller et al. |
| 9,035,506 B2 | 5/2015 | Miyaji et al. |
| 9,114,512 B2 | 8/2015 | Beer et al. |
| 9,120,213 B2 | 9/2015 | Elger |
| 9,138,128 B2 | 9/2015 | Teichtmann |
| 9,149,917 B2 | 10/2015 | Beer et al. |
| 9,221,156 B2 | 12/2015 | Bachman et al. |
| 9,272,399 B2 | 3/2016 | Chen et al. |
| 9,701,006 B2 | 7/2017 | Borst |
| 9,751,196 B2 | 9/2017 | Hu et al. |
| 9,775,666 B2 | 10/2017 | Manna et al. |
| 9,802,298 B2 | 10/2017 | Hu |
| 10,160,104 B2 | 12/2018 | Hu |
| 10,173,311 B2 | 1/2019 | Takeda |
| 10,232,495 B2 | 3/2019 | Hu |
| 10,373,715 B2 | 8/2019 | Still et al. |
| 10,456,895 B2 | 10/2019 | Ely |
| 10,525,572 B2 | 1/2020 | Hu et al. |
| 10,549,410 B2 | 2/2020 | Hu et al. |
| 10,625,405 B2 | 4/2020 | Silha et al. |
| D891,213 S | 7/2020 | Hattori et al. |
| 10,751,860 B2 | 8/2020 | Hu |
| 10,800,013 B2 | 10/2020 | Hu |
| 10,913,142 B2 | 2/2021 | Takeda |
| 11,000,293 B2 | 5/2021 | Macdonald et al. |
| 2005/0090216 A1 * | 4/2005 | Hsu ....................... B25B 21/004 455/184.1 |
| 2008/0190246 A1 * | 8/2008 | Hsu ....................... B25B 23/147 81/57.13 |
| 2009/0277313 A1 * | 11/2009 | Wise ....................... B25B 13/46 81/479 |
| 2011/0064978 A1 * | 3/2011 | McGahan ........... H01M 50/213 429/61 |
| 2011/0073342 A1 | 3/2011 | Gilsdorf et al. |
| 2011/0235828 A1 | 9/2011 | Chang |
| 2013/0161039 A1 * | 6/2013 | Rakaczki ................. B25F 5/02 173/15 |
| 2014/0102742 A1 * | 4/2014 | Eshleman ............. B25B 21/004 173/183 |
| 2014/0157961 A1 | 6/2014 | Chen |
| 2017/0057061 A1 | 3/2017 | Hu |
| 2018/0215029 A1 | 8/2018 | Steckel |
| 2019/0054600 A1 | 2/2019 | Lai |
| 2019/0072269 A1 * | 3/2019 | Lin ....................... B25B 13/463 |
| 2019/0134791 A1 * | 5/2019 | LaCoste .................. B25B 13/04 |
| 2019/0134792 A1 | 5/2019 | Hu |
| 2019/0275647 A1 | 9/2019 | Silha et al. |
| 2019/0351534 A1 | 11/2019 | Hsu et al. |
| 2020/0023507 A1 | 1/2020 | Schiltz et al. |
| 2020/0039035 A1 | 2/2020 | Nick |
| 2020/0039036 A1 | 2/2020 | Ely |
| 2020/0061782 A1 | 2/2020 | Banholzer et al. |
| 2020/0171631 A1 | 6/2020 | Hu |
| 2020/0177047 A1 * | 6/2020 | Kutsuna ............... H02K 11/215 |
| 2020/0198099 A1 * | 6/2020 | Chen ....................... B25B 13/46 |
| 2020/0206884 A1 | 7/2020 | Silha et al. |
| 2020/0215666 A1 | 7/2020 | Schultz |
| 2020/0230787 A1 | 7/2020 | Zhao |
| 2021/0069888 A1 * | 3/2021 | Hairul ....................... H01H 9/06 |
| 2021/0252689 A1 | 8/2021 | Gisselman et al. |
| 2021/0362307 A1 * | 11/2021 | Anderson ................. B25F 3/00 |
| 2022/0331936 A1 * | 10/2022 | Shi ........................ B25B 21/004 |

FOREIGN PATENT DOCUMENTS

| | | | |
|---|---|---|---|
| CN | 108453657 B | 9/2020 | |
| DE | 202013104844 U1 | 3/2014 | |
| EP | 0293706 A1 | 12/1988 | |
| EP | 0293706 B1 | 9/1991 | |
| EP | 1998934 B1 | 7/2013 | |
| EP | 2688080 A2 * | 1/2014 | ............... B25F 5/00 |
| GB | 2415652 A | 1/2006 | |
| JP | 4259082 B2 | 4/2009 | |
| JP | 4939673 B2 | 5/2012 | |
| JP | 5743303 B2 | 7/2015 | |
| JP | 5764388 B2 | 8/2015 | |
| JP | 2020044627 A | 3/2020 | |
| JP | 6675296 B2 | 4/2020 | |
| WO | 200462077 A2 | 7/2004 | |
| WO | 2016008321 A1 | 1/2016 | |
| WO | 2018121723 A1 | 7/2018 | |
| WO | 2019105097 A1 | 6/2019 | |
| WO | 2019211047 A1 | 11/2019 | |
| WO | 19238388 A1 | 12/2019 | |

* cited by examiner

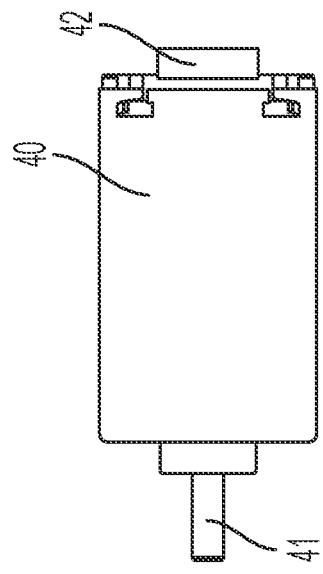 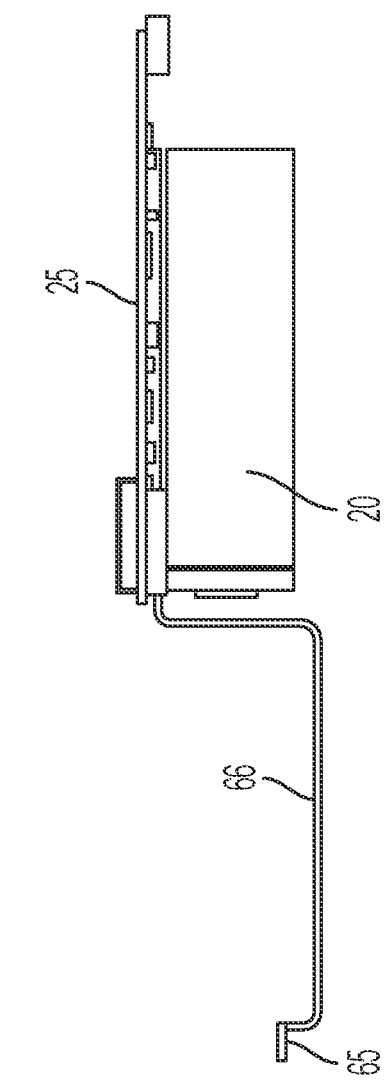
FIG. 7
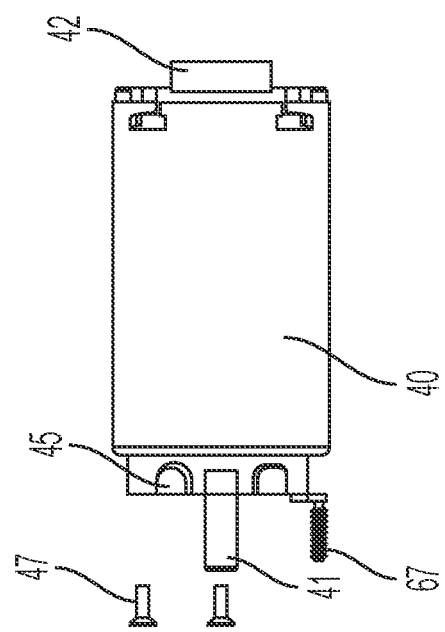 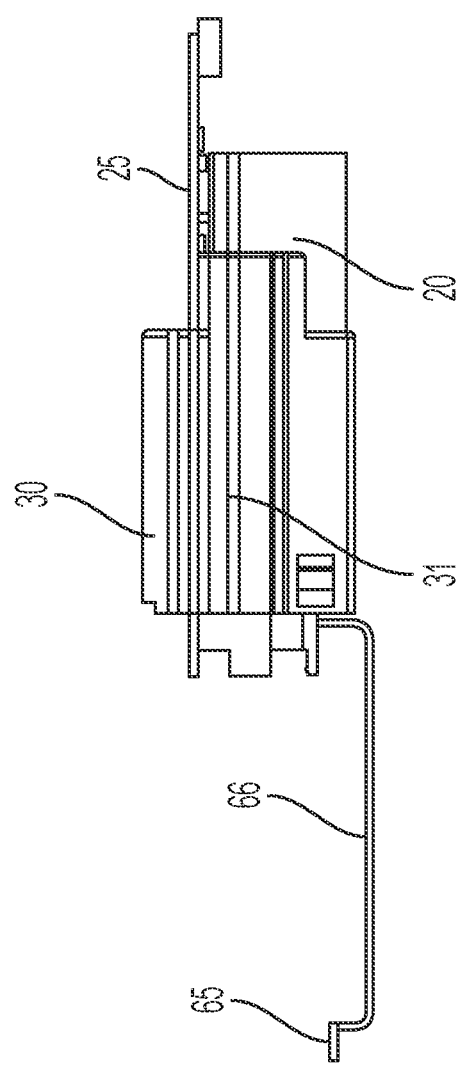
FIG. 8

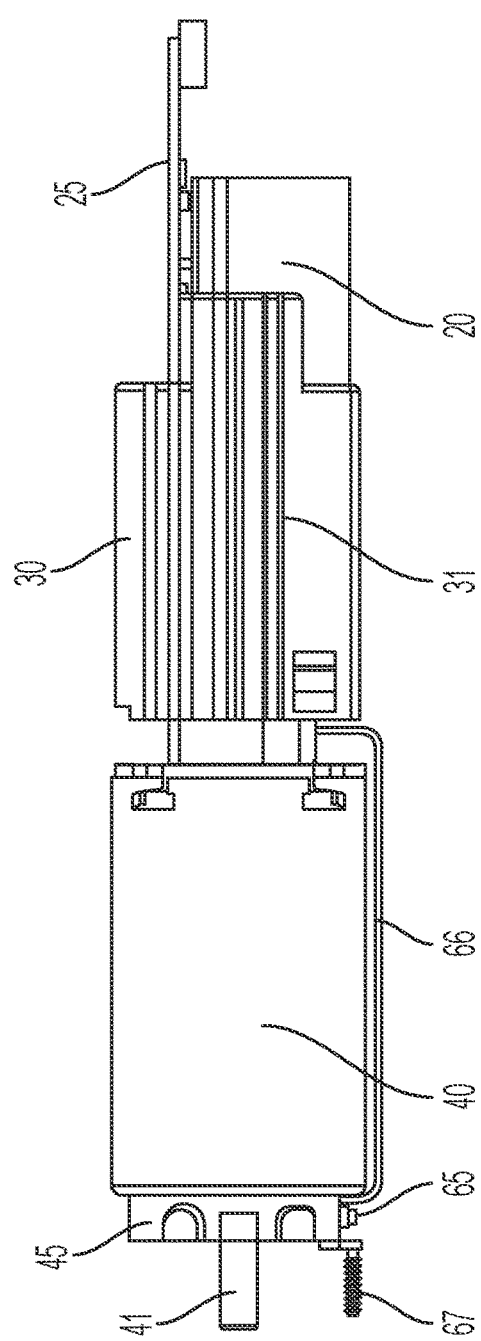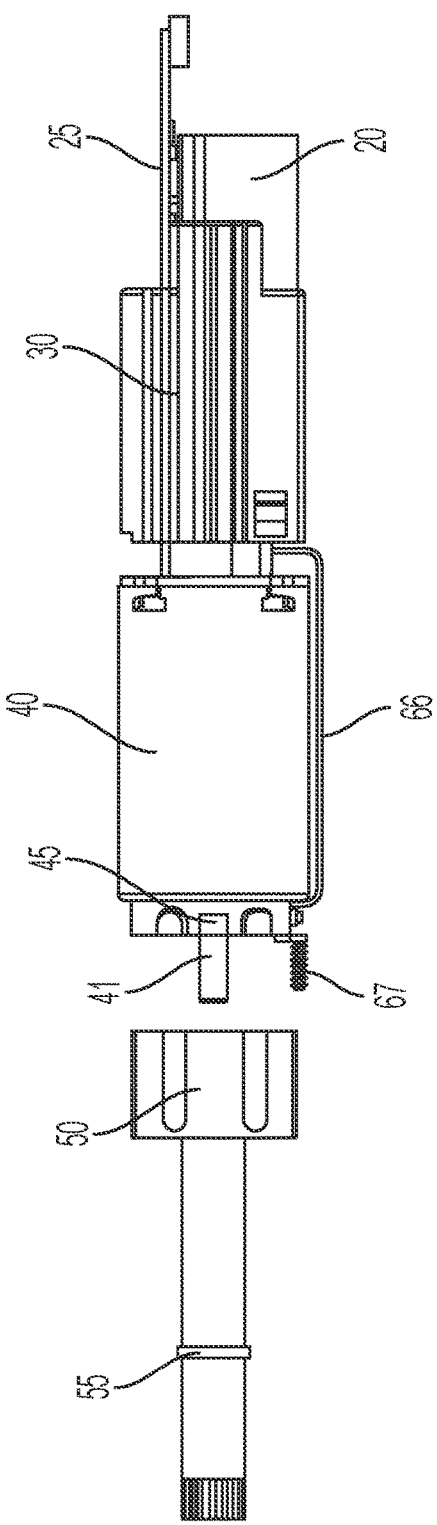

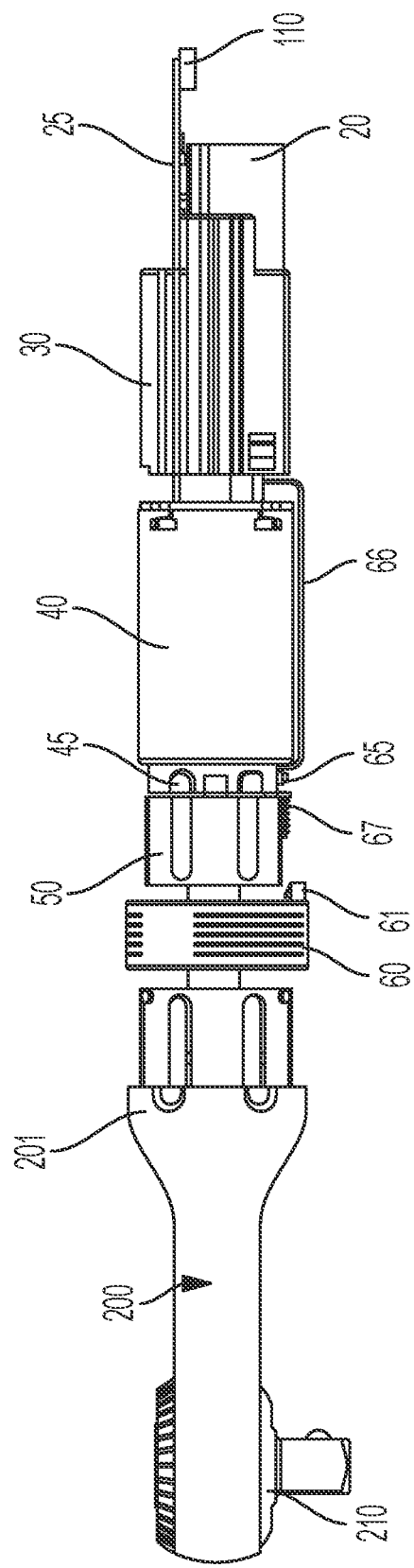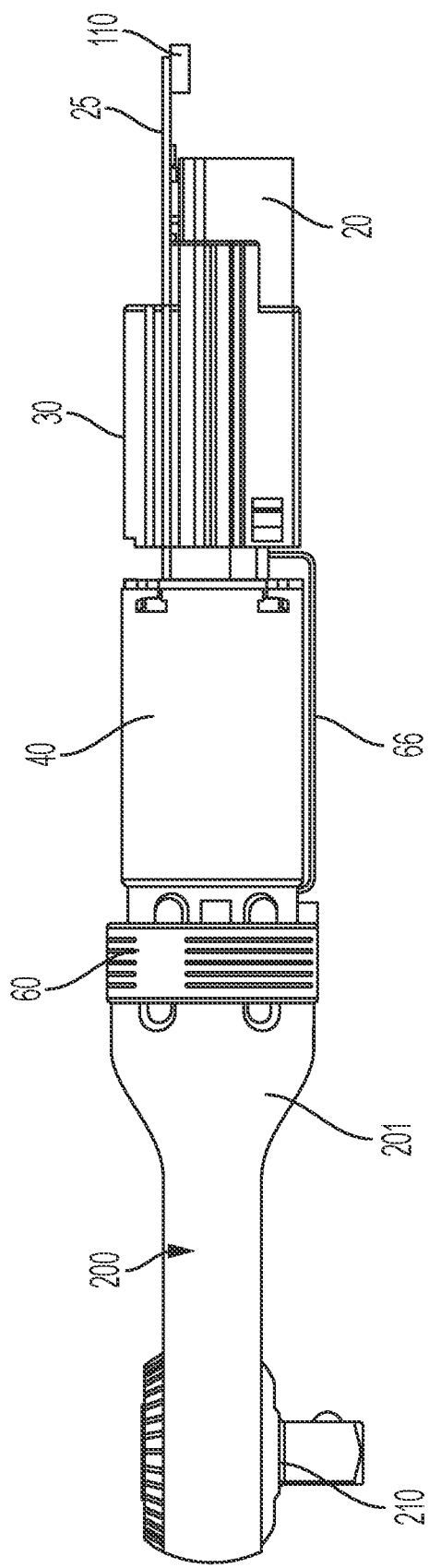
FIG. 11
FIG. 12

COMPACT POWERED WRENCH

CROSS-REFERENCE TO RELATED APPLICATIONS

This application claims the benefit of U.S. Provisional Application No. 63/153,758 filed on Feb. 25, 2021, entitled Compact Powered Wrench. The entire contents of which are incorporated herein by reference.

FIELD OF THE INVENTION

The present invention relates to power tools such as a compact ratcheting wrench.

BACKGROUND

There are various existing battery powered tools such as wrenches. It is desired to provide a powered tool with an improved construction.

SUMMARY

According to one aspect, there is an exemplary embodiment of a wrench. The wrench includes a motor; a battery assembly including a battery cell; a support tube surrounding at least a portion of the motor and a portion of the battery assembly; and a handle surrounding the support tube.

The support tube may surround at least a portion of the battery cell.

The battery assembly may include a printed circuit board.

The battery assembly may include a skeleton.

The printed circuit board and the battery cell may be housed in the skeleton.

The skeleton may include fins.

The support tube may be hollow and cylindrical.

The support tube may be made of steel.

The support tube may be made of phosphate steel.

The support tube may be an integrally formed tube.

The handle may be an integrally formed tube.

The handle may be made of plastic.

The handle may be made of semi-rigid plastic.

The wrench may further include an end cap secured to a rear end of the handle.

The end cap may be made of a hard plastic.

The wrench may have a forward end with an output member and a rear end opposite the forward end.

The motor may have a motor forward end closer to the forward end of the wrench and a motor rear end opposite the motor forward end.

The wrench may further include an actuating switch near the motor forward end.

The wrench may further include a wire connecting the switch to the printed circuit board.

The wrench may further include a crown configured to actuate the wrench.

The crown may be configured to translate.

The crown may be biased toward a forward end of the wrench.

The crown may be biased into the off position.

According to another aspect, there is an exemplary embodiment of a method of assembly of a wrench. The method may include: providing a motor and a battery assembly; connecting the motor and the battery assembly; connecting a tool head to the motor; and sliding a support tube over at least a portion of the motor and the battery assembly.

The support tube may be a hollow cylindrical tube.

The battery assembly may include a battery cell.

The support tube may be slid over at least a portion of the battery cell.

The support tube may be an integral single part.

The method may further include sliding a handle over the support tube.

The handle may be a hollow tube.

The handle may be an integral single part.

The method may further include assembling an end cap to the handle.

The end cap may be assembled with the handle before the handle is slid over the support tube.

In another aspect, there is an exemplary embodiment of a wrench. The wrench includes a motor; a battery assembly including a battery cell; a support tube surrounding at least a portion of the motor and a portion of the battery assembly; and a handle surrounding the support tube. A user-actuated crown is located near a forward end of the wrench for actuation of the wrench.

The wrench may further include a rod operatively connected to the crown.

The rod may be operatively connected to the crown by a projection.

The rod may run along an outside of the support tube.

The rod may be housed in a non-magnetic stainless steel housing tube.

The rod may be non-magnetic.

The rod may be stainless steel.

A magnet may be affixed to an end of the rod opposite the crown.

A rear end of the housing tube may be closed by a cap.

A spring may be housed in the housing tube and bias the rod in a forward direction.

The wrench may further comprise a hall effect sensor to sense the magnet.

The wrench may be activated based on the hall effect sensor sensing the magnet.

The printed circuit board may include a controller.

BRIEF DESCRIPTION OF THE DRAWINGS

FIG. 7 is a side view of a partial assembly of the exemplary embodiment of a wrench;

FIG. 8 is a side view of a partial assembly of the exemplary embodiment of a wrench;

FIG. 9 is a side view of a partial assembly of the exemplary embodiment of a wrench;

FIG. 10 is a side view of a partial assembly of the exemplary embodiment of a wrench;

FIG. 11 is a side view of a partial assembly of the exemplary embodiment of a wrench;

FIG. 12 is a side view of a partial assembly of the exemplary embodiment of a wrench;

DETAILED DESCRIPTION OF EXEMPLARY EMBODIMENTS

Figure 1:
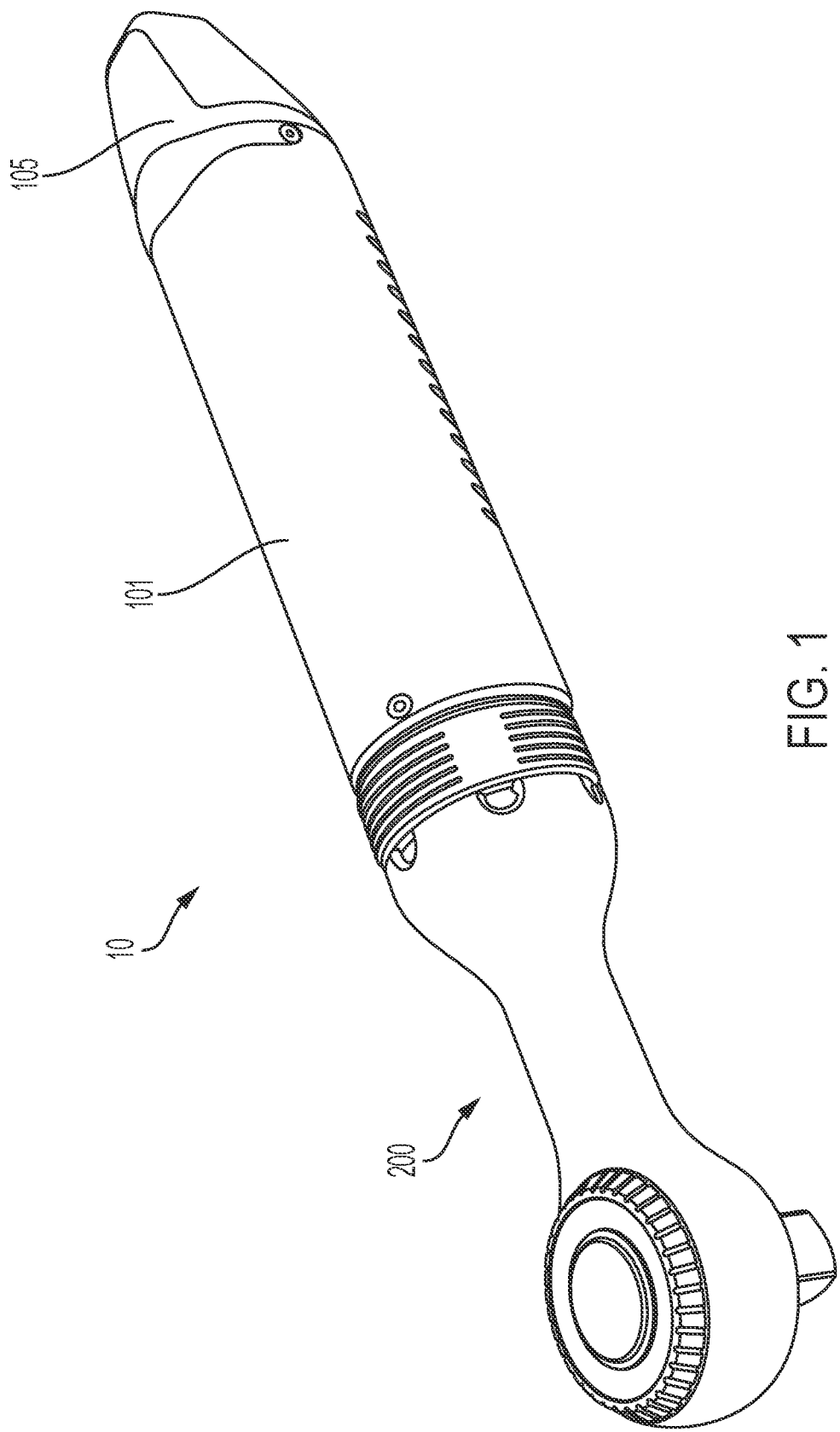
FIG. 1 illustrates a perspective view of an exemplary embodiment of a wrench according to the present application.
Figure 2:
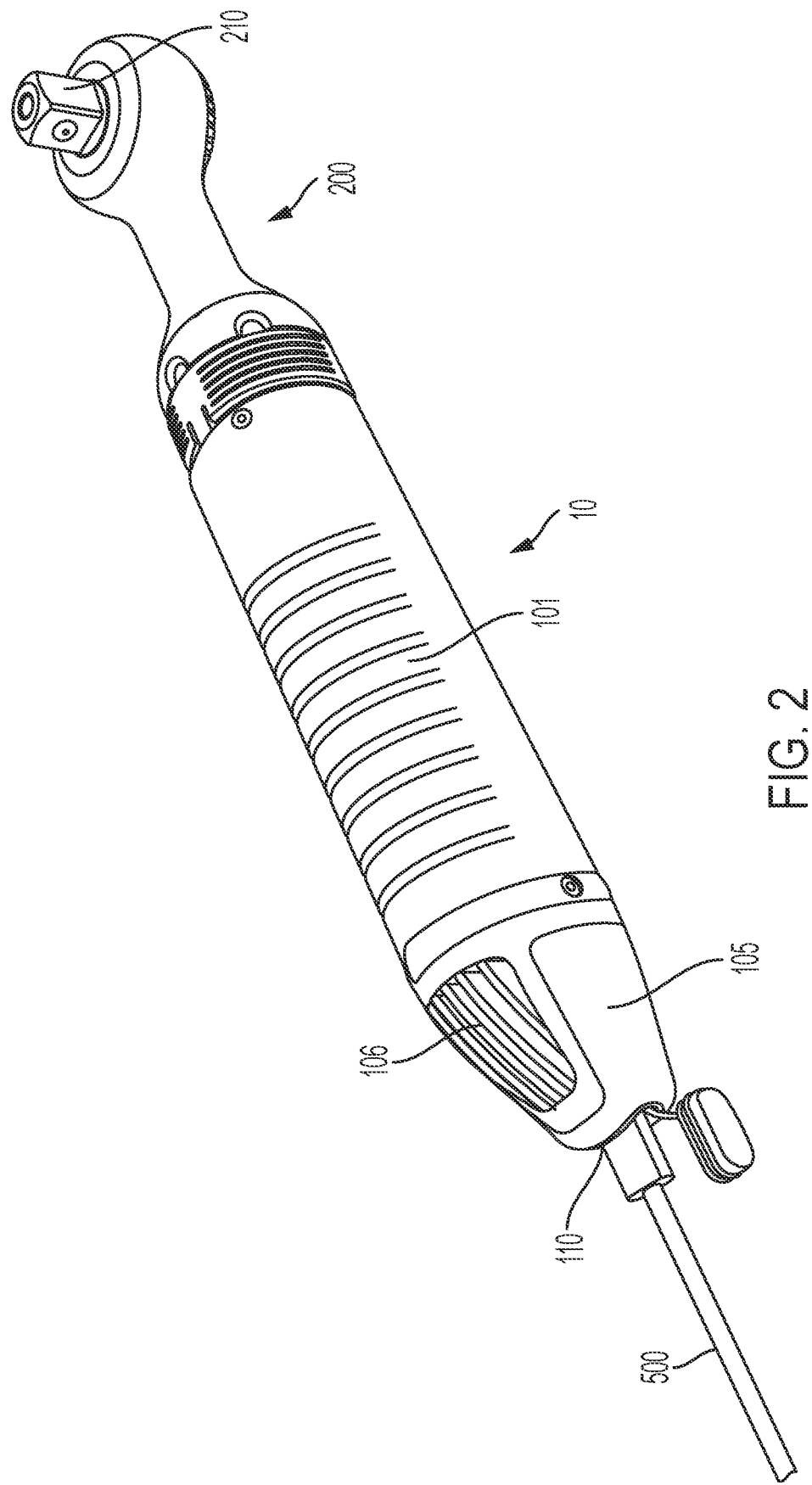
FIG. 2 is another perspective view of the exemplary embodiment of a wrench.
Figure 3:
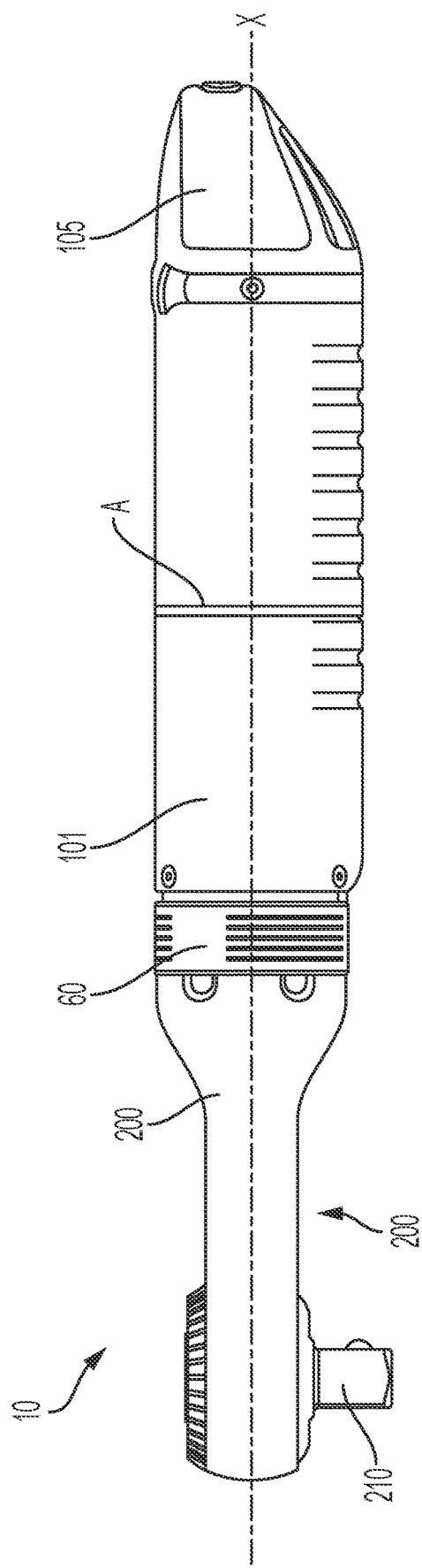
FIG. 3 is a side view of the exemplary embodiment of a wrench.
Figure 4:
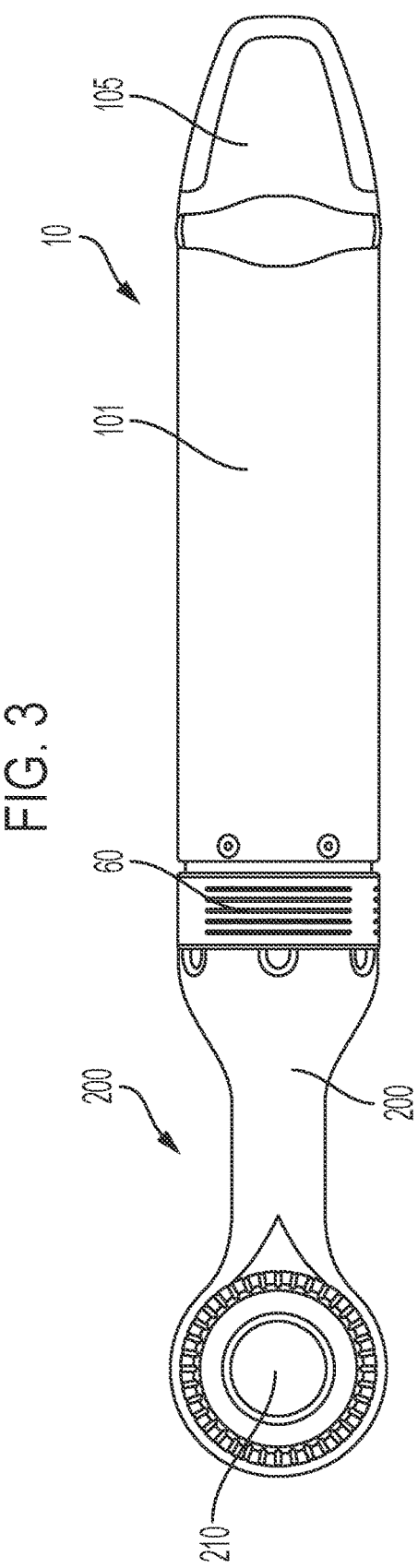
FIG. 4 is a top view of the exemplary embodiment of a wrench.

FIGS. 1-4 illustrate a non-limiting, exemplary embodiment of a ratcheting wrench 10 according to the present application. FIG. 1 is a top perspective view of the wrench 10, FIG. 2 is a bottom perspective view of the wrench 10, FIG. 3 is a side view of the wrench 10 and FIG. 4 is a top view of the wrench. As shown in FIGS. 1-4, the wrench 10 has a generally cylindrical body portion 100 and a tool head portion 200. The body portion 100 includes a handle 101 which can be gripped by a user.

Figure 17:
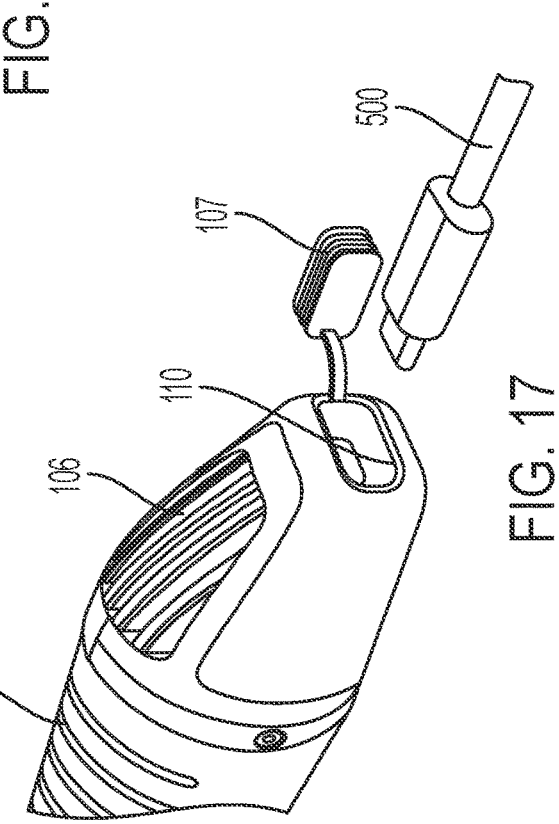
FIG. 17 is a close-up perspective view of a rear portion of the exemplary embodiment of a wrench.

A rear end of the body portion 100 comprises a cap 105. A close-up view of the cap 105 is illustrated in FIG. 17. The cap 105 may house a charging connector 110 such as the USB-C plug 110 shown in the exemplary embodiment. Other charging connectors may be used such as other types of USB plugs or other types of charging connectors. The cap 105 may also include air exhaust vents 106. Additionally, there may be a dust cap 107 preventing dust, debris or other materials from getting into the charging connector 110.

The tool head portion 200 includes a tool head structure 201 and an output member 210. The output member 210 in this case is a ratcheting wrench output.

Figure 5:
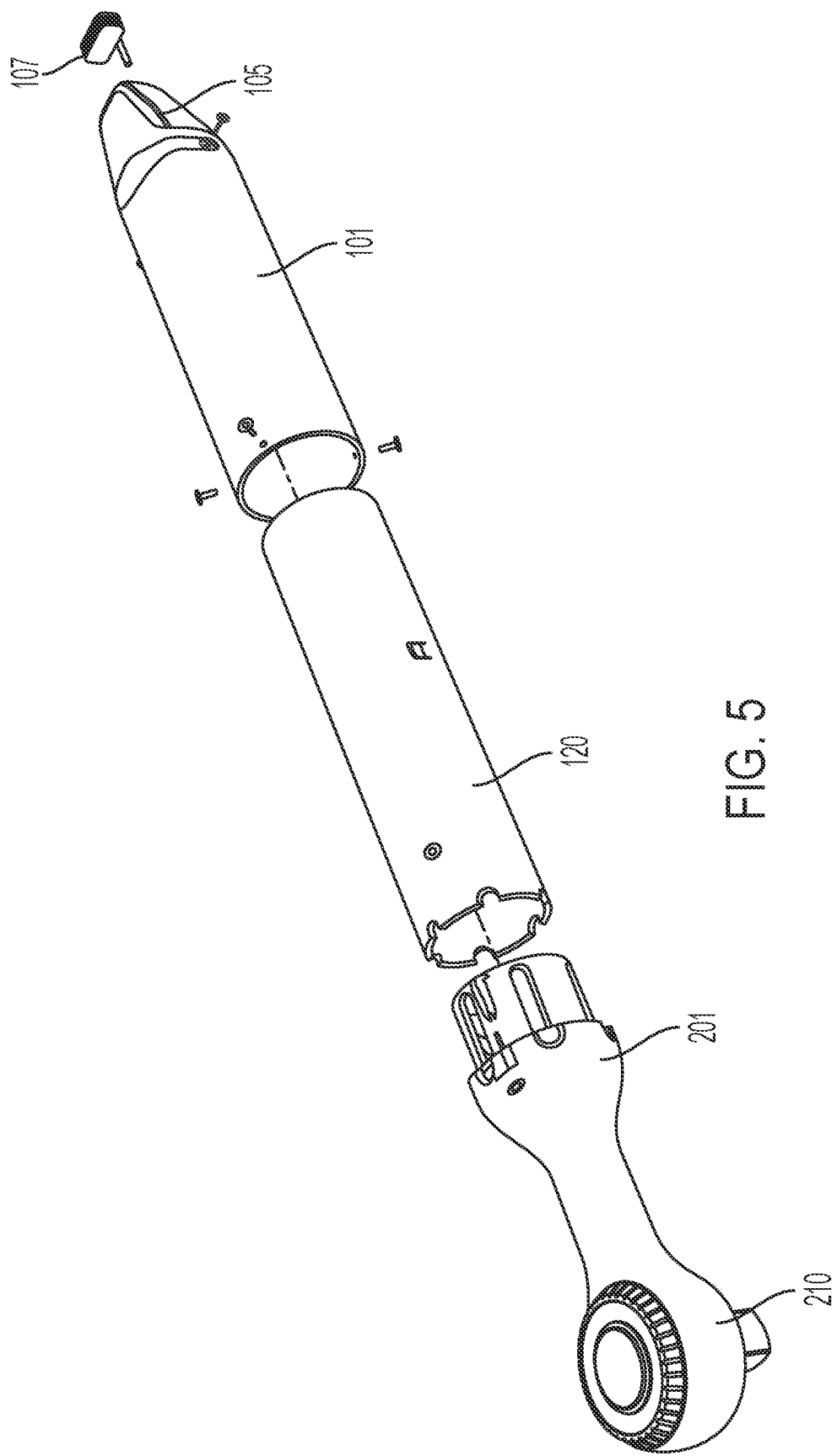
FIG. 5 is an exploded perspective view of the exemplary embodiment of a wrench.

FIG. 5 is an exploded view of the wrench 10 structural components. As shown in FIG. 5, the wrench 10 includes a cap 105 at a rear end. The cap 105 is attached to a handle 101. The handle 101 is a cylindrically hollow tube. In the exemplary embodiment, the handle 101 is integrally formed as a single part tube. By using an integral part, rather than a handle made of multiple half-cylinder components held together by fasteners, the rigidity of the tool can be increased.

In other embodiments, a handle may be made differently, such as a pair of half-cylinders fastened together.

In the exemplary embodiment, the handle 101 is made of a semi-rigid plastic and the cap 105 is made of a hard plastic such that the cap 105 is made of a harder and more rigid material than the handle 101. In other embodiments, the handle 101 and cap 105 may be made of the same material. For example, the handle 101 and cap 105 may both be made of semi-rigid plastics or both may be made of hard plastics. Other exemplary embodiments may use other materials for the handle 101 and cap 105.

A support tube 120 is disposed inside the handle 101. The support tube 120 is a cylindrically hollow tube. In the exemplary embodiment, the support tube 120 is integrally formed as a single part tube. By using an integral part, rather than multiple half-tube components held together by fasteners, the rigidity of the tool can be increased. The rigidity of the wrench 10 of the present exemplary embodiment allows for manual usage that requires the tool to withstand high manual torques.

In other embodiments, a support tube may be made differently, such as a pair of half-cylinders fastened together.

The support tube 120 provides structural support and rigidity to the wrench 10. This allows the wrench 10 to provide significant torque to a bolt without overly bending or breaking the body portion 100 of the wrench. The support tube 120 may be made of metal, such as phosphated steel. Phosphated steel provides good structural support and light weight. Other metals or materials may be used.

A front end of the wrench 10 includes a tool head portion 200. The tool head portion 200 includes the tool head structure 201 and output member 210. The tool head structure 201 is attached to both the support tube 120 and the handle 101. The tool head structure 201 may be made of metal such as steel or aluminum.

Figure 6:
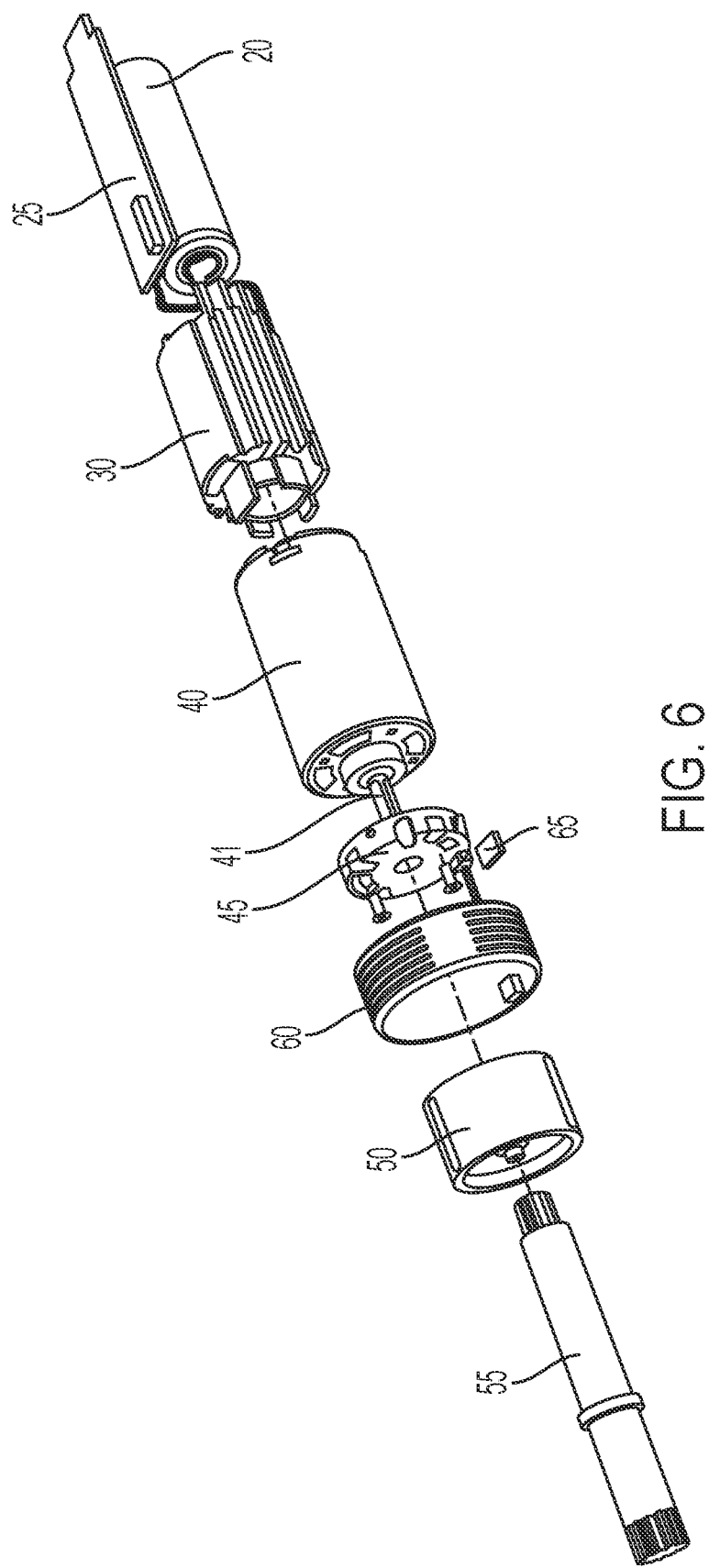
FIG. 6 is an exploded perspective view of the exemplary embodiment of a wrench.

FIG. 6 is an exploded view of mostly internal functional parts of the wrench 10. As shown in FIG. 6, the rear end of the assembly includes a battery cell 20. The battery cell 20 of the exemplary embodiment is a cylindrical battery cell. A printed circuit board (PCB) 25 is disposed on the battery cell 20. The PCB 25 is electrically connected to the positive and negative terminals of the battery cell 20. Additionally, the USB connector 110 may be mounted on or to the PCB 25. The PCB 25 may also include a controller for functions related to control of the battery and the motor 40, such as a charge and discharge control for the battery 20.

The battery cell 20 and PCB 25 are housed in skeleton 30 and together the battery cell 20, PCB 25 and skeleton 30 constitute a battery cell assembly. In the exemplary embodiment, the skeleton 30 includes a number of fins 31 which may help direct airflow and dissipate heat. The skeleton 30 is housed inside the support tube 120 and portions of the skeleton 30 may contact an inner surface of the tube 120. The skeleton 30 of the exemplary embodiment is made of plastic. Using a material such as plastic with relatively low thermal and electrical connectivity may allow for protection of the PCB and other electrical components housed by the skeleton. Other materials having relatively low thermal and electrical connectivity may also be used.

In some exemplary embodiments, the skeleton 30 may help increase the rigidity of the support tube 120 and the wrench 10 overall.

A front end of the skeleton 30 engages a rear of the motor 40. The motor 40 may be a brushed or brushless motor. Power is supplied to the motor 40 by the battery 20. The motor 40 includes a drive shaft 41. The motor 40 is also housed in the support tube 120 and an outer surface of the motor 40 may be in contact with an inner surface of the support tube 120 and help to provide rigidity to the support tube 120 and the wrench 10 overall.

An alignment flange 45 is attached to a front end of the motor 40. The alignment flange 45 helps to align the motor 40 with a reduction gearbox 50. A transmission shaft 55 is connected to the output member 210. As also shown in FIG. 6, the wrench 10 includes an on/off crown 60. The crown 60 is slidable a small distance along a longitudinal axis of the wrench 10. Sliding the crown 60 rearward, causes the crown to activate switch 65 and activate the wrench 10. The crown 60 is connected to the PCB 25 by a wire or wires 66. This wire connection is shown in FIGS. 7-12. The crown 60 of the exemplary embodiment includes a projection 61 as shown in FIG. 11. The projection 61 may contact the switch 65 to activate the switch 65.

The crown 60 may be biased forward by a spring or other biasing member. In this forward position 60, the projection 61 is out of contact with the switch 65 and the wrench 10 is off. A user may then pull back the crown 60 so that the projection 61 actuates the switch 65. When the switch 65 is activated, the wrench 10 is controlled so that power is provided by the battery 20 to the motor 40. Rotary motion of the motor output shaft 41 is transferred to shaft 55 through a reduction gearbox 50. The transmission shaft 55 transmits this power to the output 210 in order to drive the output member 210 and tighten or loosen bolts or perform other work.

The wrench 10 is configured to provide significant power and torque while maintaining a compact shape. Additionally, the wrench is configured to have sufficient stiffness that it can be used manually as well as through motor power.

The motor 40 used for the wrench 10 is an outer rotor, brushless DC motor 40. This provides high torque while maintaining a small footprint. In the exemplary embodiment, the motor 40 has an outer diameter of 30 millimeters (mm). In various embodiments, the motor 40 may have an outer diameter of 45 mm or less; 40 mm or less; 35 mm or less; or 30 mm or less.

The battery cell 20 is a 21700 battery cell having a diameter of 21 mm and a length of 700 mm. The maximum initial battery voltage (measured without a workload) is 4 volts. The nominal voltage is 3.6V.

As shown in FIG. 3, the wrench 10 has a longitudinal axis X and a body diameter A. In this case, the diameter A of the body is an outer diameter of the handle 101. Owing to the compact nature of the design of the exemplary embodiment, the diameter A of the exemplary embodiment may be about 40 mm. This is only about 33% larger than the diameter of the motor 40 of the exemplary embodiment. In various embodiments, the diameter A may be 50 mm or less; 45 mm or less; or 40 mm or less. Additionally, the diameter A of the body may be no more than 35% larger than the diameter of the motor; no more than 40% larger than the diameter of the motor; or no more than 45% larger than the diameter of the motor.

Figure 13:
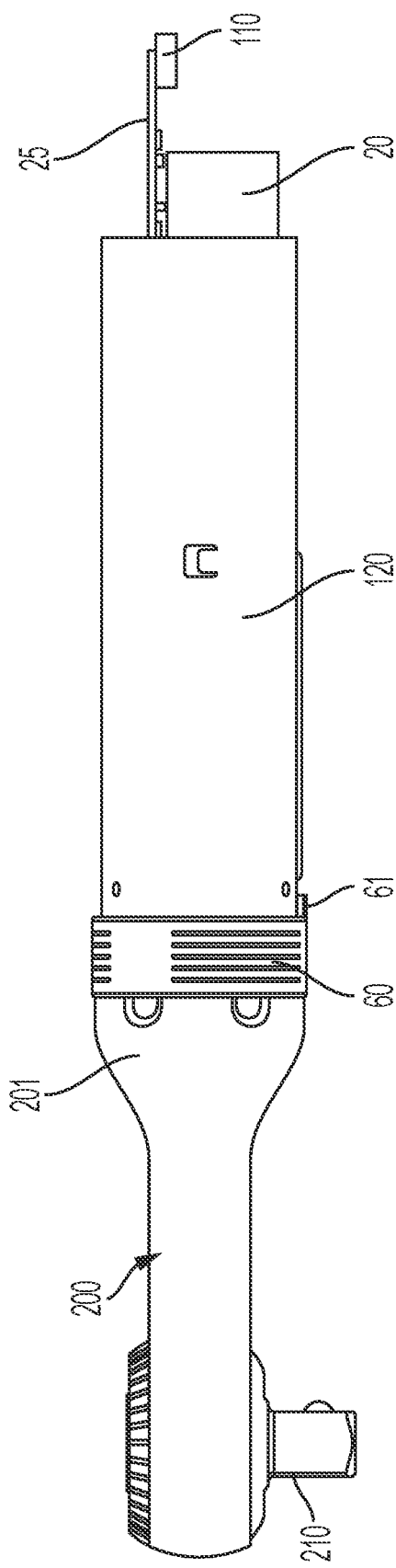
FIG. 13 is a side view of a partial assembly of the exemplary embodiment of a wrench.
Figure 14:
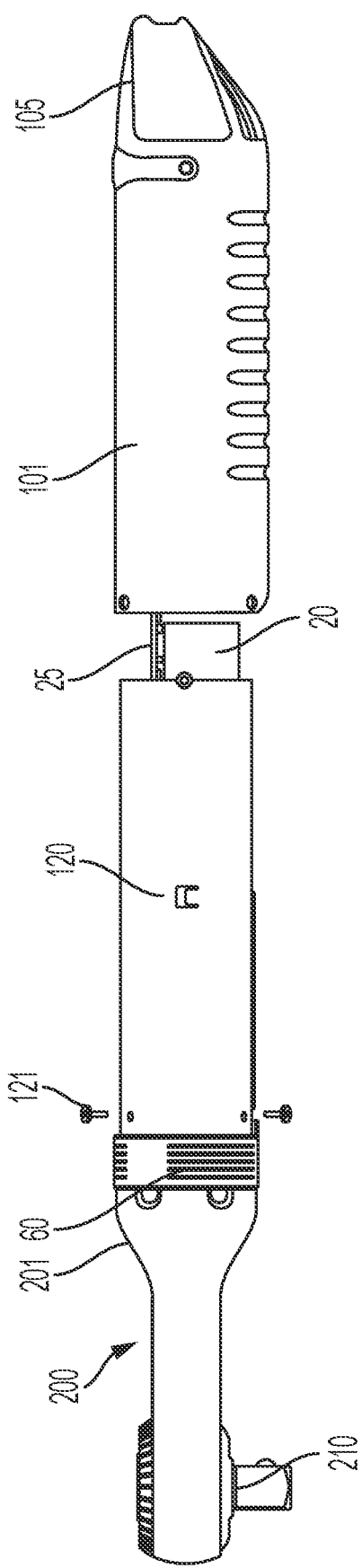
FIG. 14 is a side view of a partial assembly of the exemplary embodiment of a wrench.

FIGS. 7-14 illustrate an assembly of the parts of the wrench 10. The figures are arranged in order of assembly such that FIG. 7 is the earliest step of assembly and FIG. 14 is the latest step. FIGS. 7-14 illustrate a non-limiting, exemplary embodiment of an order of assembly operation and assembly may be performed in a different order in different embodiments.

As shown in FIG. 7, the motor 40 and battery cell 20 is provided. The PCB 25 is attached to the battery cell 20. Additionally, the switch 65 is connected to the PCB 25 through a wire 66. The PCB 25 may be fixed to the battery cell 20 by soldering and adhesive or other means or may be disposed adjacent to the battery cell 20 and located by is placement in the skeleton 30.

As shown in FIG. 8, the alignment flange 45 is secured to the motor 40. In the exemplary embodiment, the alignment flange 45 is secured to the motor 40 by screws 47. Other methods for attaching the alignment flange 45 may also be used. As additionally shown in FIG. 8, the battery cell 20 and PCB 25 are engaged with a skeleton 30. The skeleton 30 may also include the clips 32 for attaching to the motor 40. The clips 32 are designed to securely engage with a rear protrusion 42 on the motor. The skeleton 30 may include pathways or grips for wires or other electrical connectors to provide an electrical connection between the battery cell 20 and the PCB 25.

FIG. 8 also illustrates a spring 67 that biases the crown 60 forward away from engaging the switch 65. The spring 67 may be attached to the flange 45 in the step illustrated in FIG. 8.

In FIG. 9, the skeleton 30 is attached to the motor 40 via the clips 32. In particular, the clips 32 attach around a rear protrusion 42 of the motor 40. Additionally, the switch 65 is attached to the alignment flange 45 by glue.

FIG. 10 illustrates the reduction gearbox 50 and shaft 55 being attached to the alignment flange 45. The shaft 55 is aligned with the output shaft 41 and is driven by the motor 40 through the output shaft 41. In FIG. 10, the shaft 55 is attached to the reduction gearbox 50 before the gearbox 50 is attached to the motor 40. In an alternative embodiment, the reduction gearbox 50 may be attached to the motor 40 before the shaft 55 is attached to the gearbox.

In the assembly steps shown in FIGS. 11 and 12, the crown 60 and the tool head portion 210 are added. As shown in FIG. 11, the crown 60 includes a projection 61 which actuates the switch 65. The tool head portion 210 is attached to the alignment flange 45 by clips.

As shown in FIG. 13, the support tube 120 is then attached from assembled from the rear side of the assembly of the wrench 10. As shown in FIG. 13, the support tube 120 is secured in place by fasteners such as screws 121 (shown in FIG. 14). Then the handle 101 and the cap 105 are assembled over the support tube 120. The handle 101 may be secured by a snap-fit, clips adhesives or additional fasteners. In alternative embodiments, the support tube 120 may be assembled, the handle 101 may be assembled over the support tube 120 and the same fastener or fasteners may be inserted through both the handle 101 and the support tube 120 in order to secure both the handle 101 and the support tube 120. For example, the screws 121 may not be used until both the support tube 120 and handle 101 are assemble and then the screws 121 may extend through both the support tube 120 and handle 101 so as to secure both the support tube 120 and handle.

In FIG. 14 the cap 105 is assembled to the handle 101 and then the handle 101 and cap 105 are together slid over the support tube 120 to assemble the parts. In another exemplary embodiment, the cap 105 may be assembled to the handle 101 after the handle 101 is slid over the support tube 120.

Figure 15:
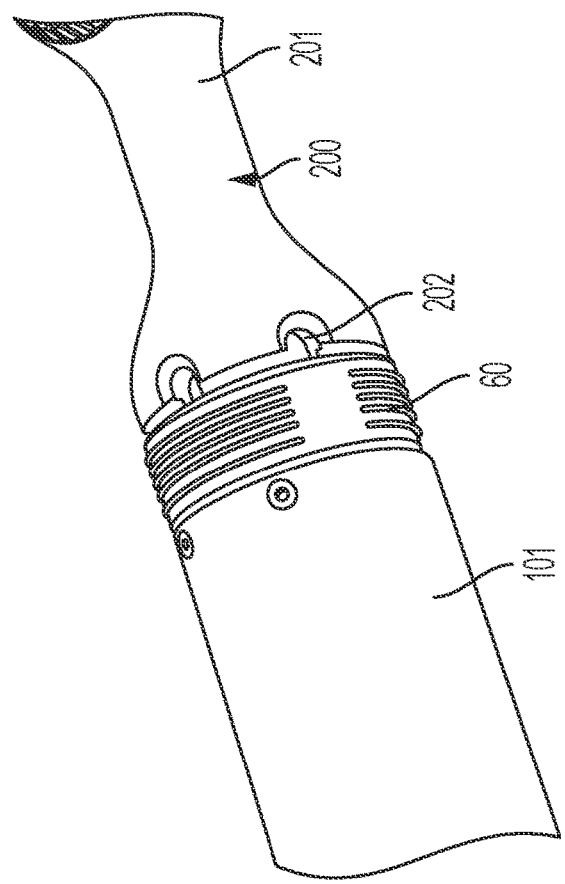
FIG. 15 is a close-up perspective view of a portion of the exemplary embodiment of a wrench.
Figure 16:
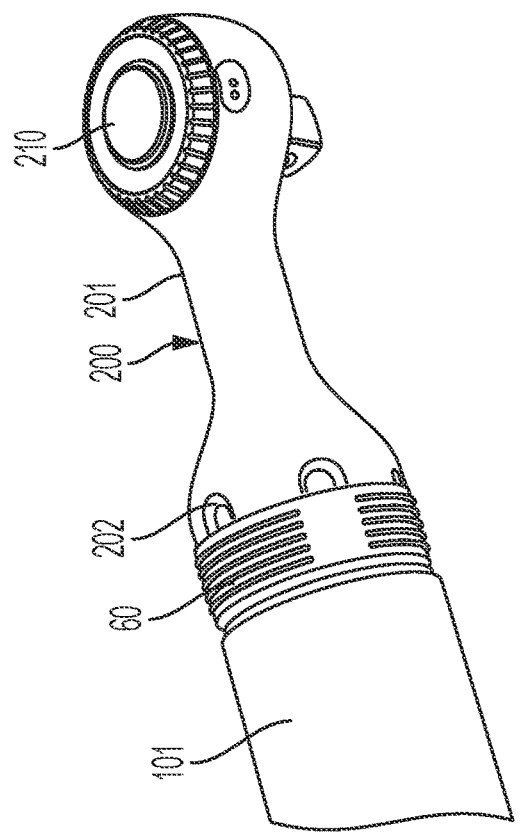
FIG. 16 is another close-up perspective view of a portion of the exemplary embodiment of a wrench.

FIGS. 15 and 16 are close-up views of a portion of the wrench 10 including the crown 60. FIG. 15 illustrates the crown 60 in the off position. In FIG. 15 the crown 60 is moved to the forward position by the spring 67 so that the crown 60 is out of contact with the switch 65. This forward position is relatively closer to the output member 210.

FIG. 16 illustrates the crown 60 in the on/activate/actuation position. In FIG. 16 the crown 60 is moved rearward, away from the output member 210. In this rearward position, the projection 61 (see FIG. 11) of the crown 60 contacts the switch 65 to turn on the wrench 10. The user may move the crown 60 rearwardly against the biasing force of the spring 67. The length of travel of the crown 60 in the exemplary embodiment of the wrench 10 is small. The axial length of travel of the crown 60 from the forward/off position to the rearward/on position may be 100 mm or less; 80 mm or less. or 60 mm or less. The small axial travel may allow for easy operation of the crown. In other embodiments, the axial length of travel may be more or less.

The placement of the crown forward of the motor 40 and adjacent to the handle 101 provides for convenient actuation. A user may generally grip the handle 101 and use a forward finger or fingers to pull back the crown 60 and actuate the wrench.

As further shown in FIGS. 15 and 16, the tool head structure 201 includes air intakes 202. Air may enter the air intakes 202 flow around the motor 40 and skeleton 30 and exit in air exhaust 106 shown in FIG. 17.

FIG. 17 is a close-up perspective view of a rear end of the wrench 10 including the cap 105. As shown in FIG. 17, the cap 105 includes a charging connector 110 which can receive a charging cord connector 500. In the exemplary embodiment, the charging connector 110 is a USB-C connector. The cap 105 also include the air exhaust vents 106. The air exhaust vents 106 are a series of parallel openings in the cap 105.

In the exemplary embodiment, the tool head portion 200 includes intakes 202 and the cap 105 includes air exhaust vents 106. The motor 40 may include a fan which drives airflow in this direction such that air generally flows in through the intakes 202 and out through the exhaust vents 106. In other embodiments, a fan may drive airflow in the opposite direction such that the vents 106 in the cap 105 generally receive air and the vents 202 in the tool head structure 201 generally exhaust the air. In other embodiments, the airflow may be ambient airflow. In that case, airflow may not be primarily in one direction, but may change depending upon the orientation of the wrench 10 or other factors such as heat dispersion.

In the exemplary embodiment, the wrench 10 is powered by an internal battery cell 20. In other embodiments, the battery cell 20 may be configured to be removable or the wrench 10 may be powered by a battery pack that is removable. Additionally, other embodiments may include more than one battery cell 20. For example, two battery cells may be placed end to end. The multiple battery cells may be accommodated by extending a length of the tool, such as the length of the handle 101.

Figure 18:
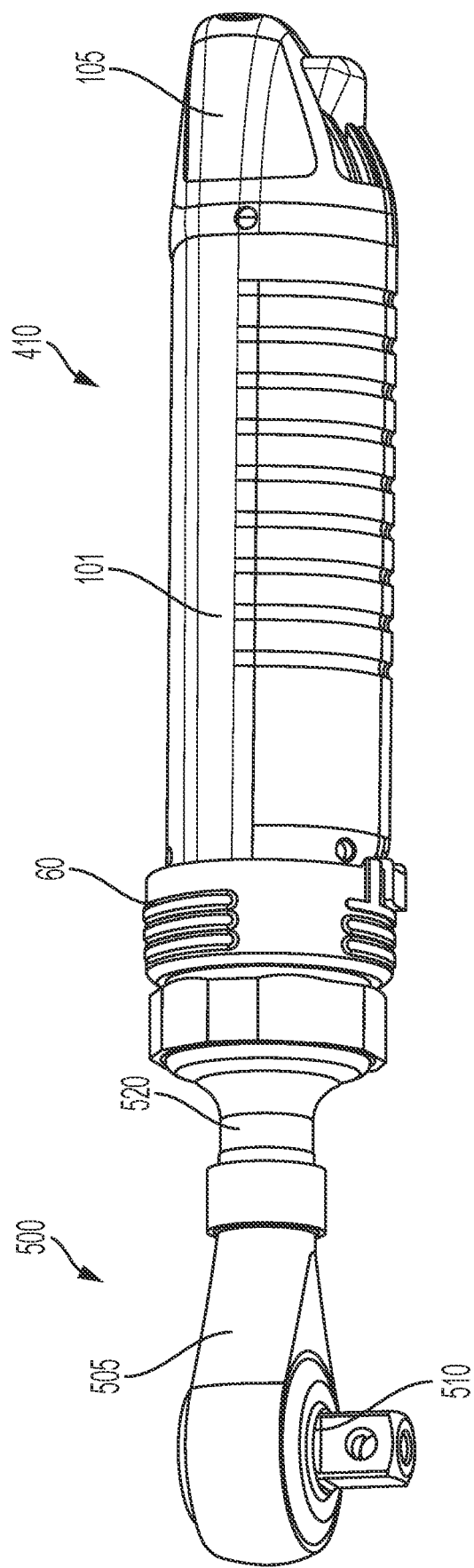
FIG. 18 is a perspective side view of another exemplary embodiment of a wrench.
Figure 20:
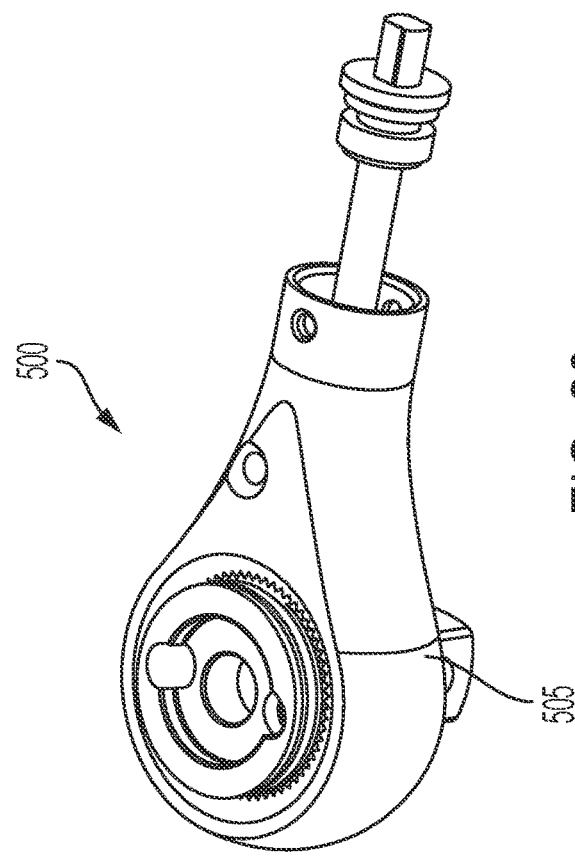
FIG. 20 is a perspective side view of a portion of the exemplary embodiment of the wrench.
Figure 19:
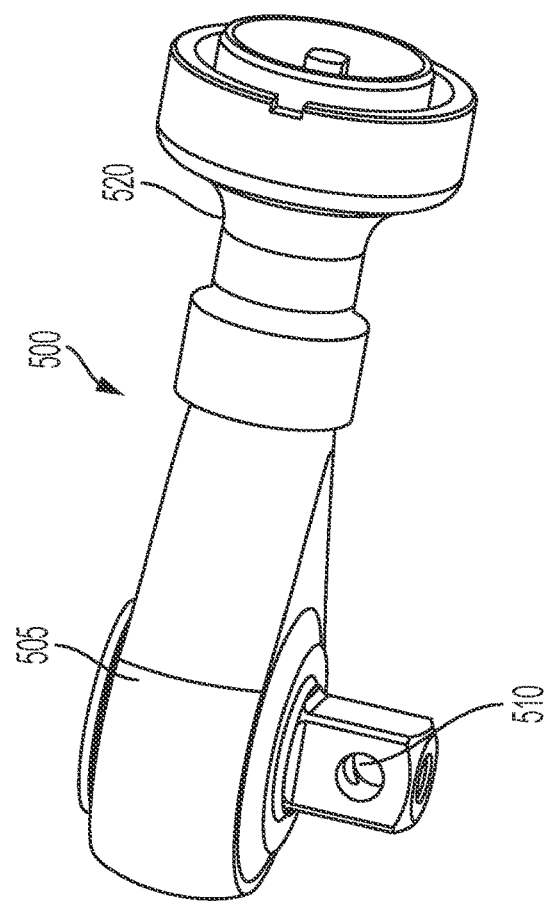
FIG. 19 is a perspective side view of a portion of the exemplary embodiment of the wrench.

Another exemplary embodiment of a wrench 410 is shown in FIGS. 18-20. The wrench 410 is the same as the wrench 10 unless otherwise shown or noted. In particular, the wrench 410 is similar to the wrench 10, except near the forward end of the wrench 410. The wrench 410 has a forward portion 500 made up of a tool head 505 and a connector 520. The tool head 505 includes an output member 510, similar to the output member 210. In the exemplary embodiment, the output member 510 is a ratcheting wrench output member. Other exemplary embodiments may include other output members such as a screwdriver or rotary tool output member.

The tool head 505 is shown with the connector 520 in FIG. 19 and the tool head 505 is shown with the connector 520 in FIG. 20.

Figure 21:
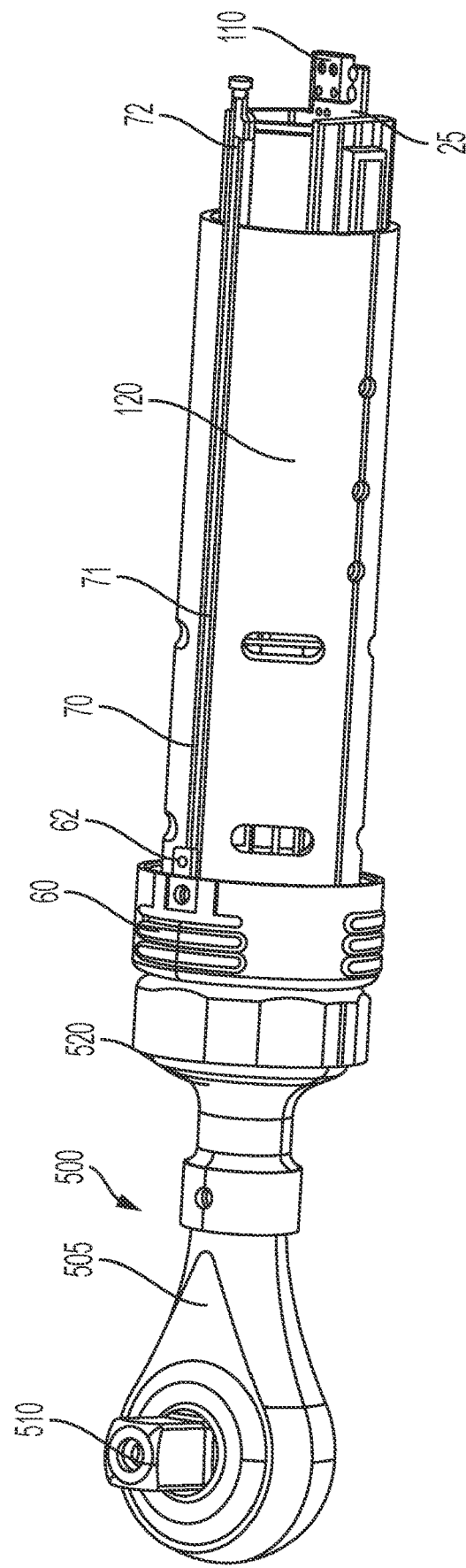
FIG. 21 is a perspective view of the exemplary embodiment of the wrench with selected parts removed.
Figure 22:
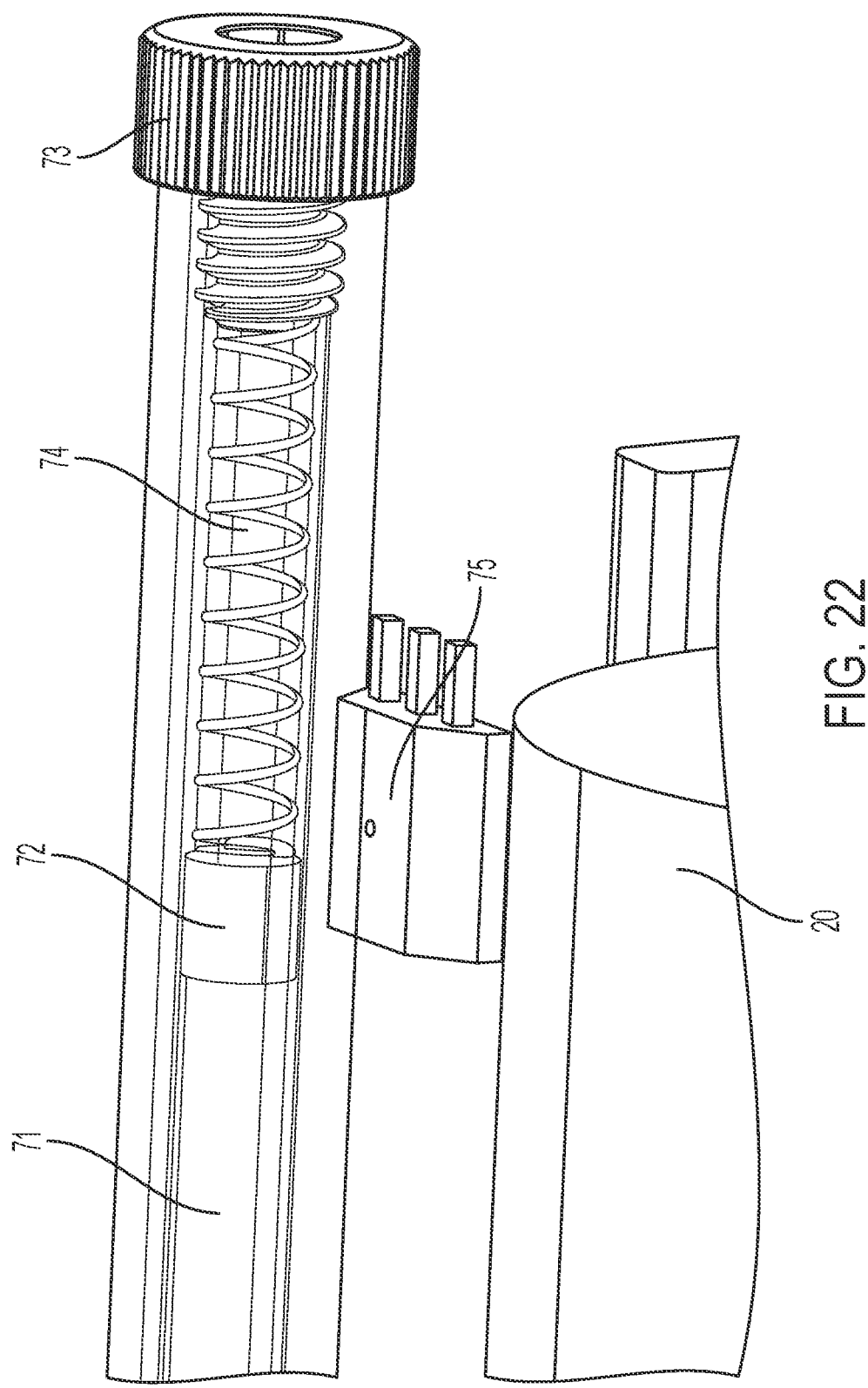
FIG. 22 is a close-up perspective view of selected parts of the exemplary embodiment of the wrench.

FIG. 21 is a perspective view of the wrench 410 with the handle 101 removed. The wrench 410 includes a modified actuation system as compared to the previous embodiment wrench 10. FIG. 22 illustrates a close-up view of various parts of the actuation system of wrench 410.

The wrench 410 includes an on/off crown 60 like the wrench 10. The crown 60 allows a user to actuate the wrench from a variety of positions by pulling the crown 60 rearward. In the wrench 410, the crown 60 includes a projection 62. The projection 62 connects to a rod 71 so that moving the crown 60 rearward, moves the projection 62 rearward and in turn the rod 71 is moved rearward. The rod 71 is housed in a tube 70 that runs along the support tube 120. The rod 71 and tube 70 may both be made of stainless steel. Other non-magnetic materials may be used instead of stainless steel. At a rear end of the rod 71 there is a magnet 72. As best shown in FIG. 22, the rod 71 may be biased forward by a spring 74 that is held in place by a cap 73 at the end of the tube 70. As also shown in FIG. 22, the wrench 410 also includes a hall effect sensor 75 which detects the magnet 72.

According to the construction of the exemplary embodiment shown in FIGS. 21 and 22, the user may pull back the crown 60 to actuate the wrench. When the user pulls back the crown 60, the projection 62 pushes back the rod 71 against the biasing force of the spring 74. The magnet 72 at the end of the rod 71 is pushed to a position to be detected by the hall sensor 75. The hall effect sensor 75 is operatively connected to the printed circuit board 25. A controller may be mounted on the PCB 25. When the movement of the magnet 72 is detected, the motor is turned on to operate the wrench 410.

As will be appreciated, in the embodiment of the wrench 410, the rod 71 serves as a linkage so that while the crown 60 is near a front of the wrench 410 at a location easily actuatable by the user, it provides an actuation signal with a magnet 72 and hall effect sensor 75 near a rear of the wrench 410. Although a hall effect sensor 75 and magnet 72 combination is used in the exemplary embodiment of the wrench 410, a mechanical switch system may also be used. In that instance, the rod or a similar linkage may cause the depression of a microswitch which is connected to the PCB 25. If a mechanical switch is used, different materials may be used for the rod and the tube.

As shown in FIGS. 21 and 22, the rod 71 and tube 70 are on a side of the support tube 120 opposite to the PCB 25. In other embodiment, the rod 71 and tube 70 or another linkage system may run adjacent to the support tube 120 at the side adjacent to the PCB 25.

Figure 23:
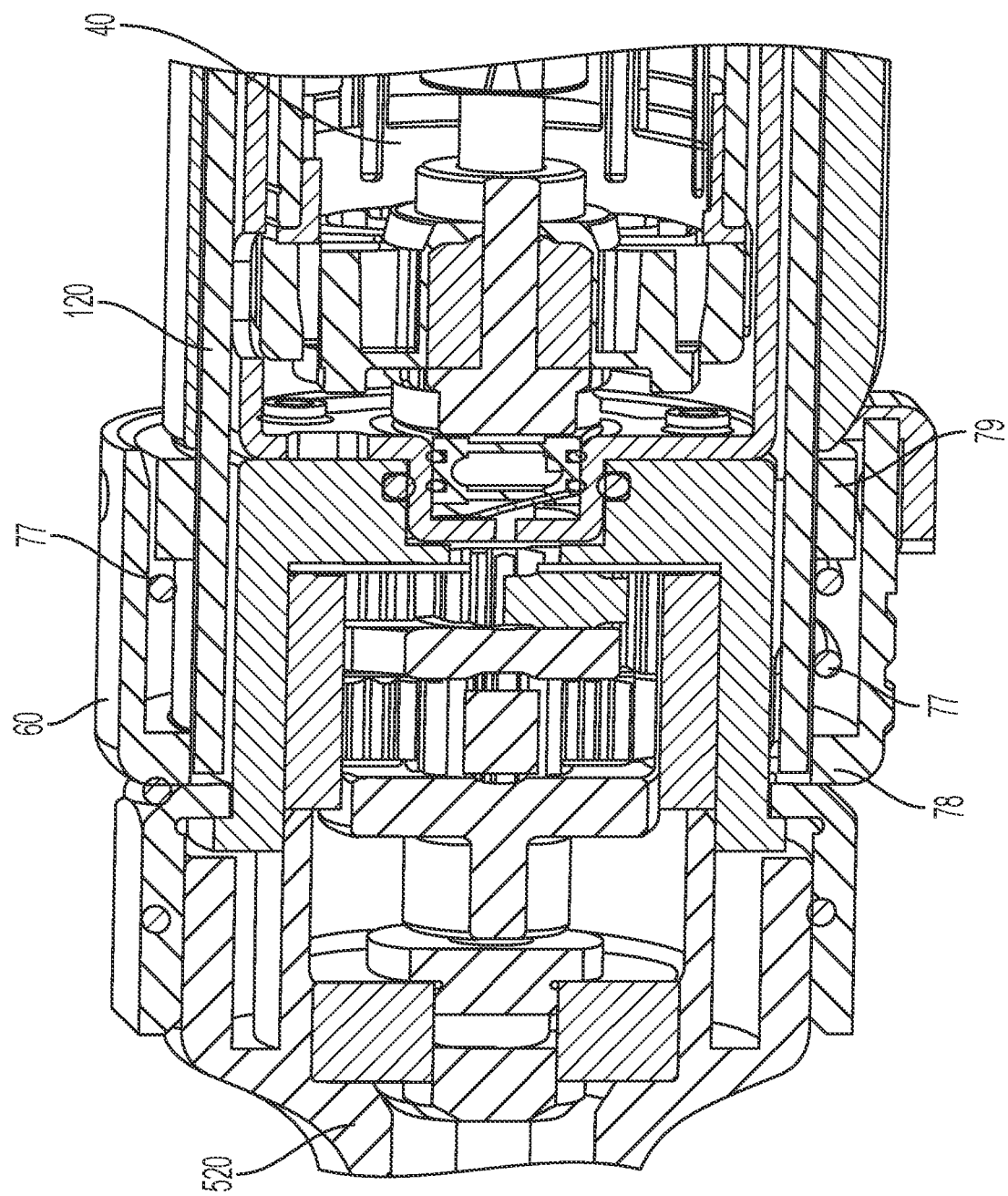
FIG. 23 is a cross-sectional side view of a portion of the exemplary embodiment of the wrench.

FIG. 23 is a cross sectional view of the wrench 410 at the crown 60. As shown in FIG. 23, the crown 60 may be biased by a compression spring 77 that wraps around circumference of the support tube 120 and is enclosed between the support tube 120 and the crown 60. Because the spring 77 wraps around the circumference, it provides a symmetrical biasing force. The spring 77 is held at a front end by a shoulder 78 of the crown and at a rear end by a blocking shoulder 79.

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims It is to be understood that the present disclosure contemplates that, to the extent possible, one or more features of any embodiment can be combined or exchanged with one or more features of any other embodiment. For example, the compression spring 77 may be used with the exemplary embodiment of the wrench 10 instead of or in addition to the spring 67. Similarly, the actuation system utilizing the projection 62, tube 70, rod 71, magnet 72 and hall sensor 75 may be used in the exemplary embodiment of the wrench 10 in place of the projection 61 and switch 65.

What is claimed is:

1. A power tool, comprising:

a tool head including a tool output member;
a motor configured to selectively drive the tool output member;
a battery assembly including a battery cell, the battery cell providing power to the motor;
a support tube surrounding at least a portion of the motor and a portion of the battery assembly;
a handle surrounding the support tube; and
a crown, wherein the crown is user-actuated and is configured to actuate the power tool;
wherein the power tool has a longitudinal axis;
wherein the crown extends around the longitudinal axis;
wherein the crown is translatable along the longitudinal axis;
wherein the crown includes a projection that projects in a direction parallel to the longitudinal axis; and
wherein the projection is translatable to contact a switch of the power tool.

2. The power tool of claim 1, wherein the support tube surrounds at least a portion of the battery cell.

3. The power tool of claim 2, wherein the support tube is hollow and cylindrical.

4. The power tool of claim 3, wherein the support tube is an integrally formed tube.

5. The power tool of claim 1, wherein the battery assembly includes a printed circuit board and a skeleton; and
wherein the skeleton holds the printed circuit board and the battery cell.

6. The power tool of claim 5, further comprising a controller mounted to the printed circuit board.

7. The power tool of claim 1, wherein the handle is an integrally formed tube.

8. The power tool of claim 7, wherein the handle is made of semi-rigid plastic.

9. The power tool of claim 1, further comprising an end cap secured to a rear end of the handle.

10. The power tool of claim 9, wherein the end cap is made of a hard plastic.

11. A power tool, comprising:
a tool head including a tool output member;
a motor configured to selectively drive the tool output member;
a battery assembly including a battery cell, the battery cell providing power to the motor;
a support tube surrounding at least a portion of the motor and a portion of the battery cell;
a handle surrounding the support tube; and
a crown, wherein the crown is user-actuated and is configured to actuate the power tool;
wherein the support tube is an integrally formed tube;
wherein the battery assembly includes a printed circuit board and a skeleton;
wherein the skeleton holds the printed circuit board and the battery cell;
wherein the crown extends around a longitudinal axis of the power tool;
wherein the crown is translatable along the longitudinal axis;
wherein the crown includes a projection that projects in a direction parallel to the longitudinal axis; and
wherein the projection is translatable to contact a switch of the power tool.

12. The power tool of claim 11, wherein the handle is an integrally formed tube.

13. A power tool, comprising:
a tool head including a tool output member;
a motor configured to selectively drive the tool output member;
a battery cell providing power to the motor;
a handle surrounding at least one of the battery cell or the motor; and
a crown, wherein the crown is user-actuated and is configured to contact a switch to actuate the power tool;
wherein the power tool has a longitudinal axis;
wherein the crown extends around the longitudinal axis;
wherein the crown is translatable along the longitudinal axis; and
wherein the crown is a component external to the handle and configured to be directly engaged by a user.

14. The power tool of claim 13, wherein the crown is configured to translate 100 millimeters or less.

15. The power tool of claim 13, wherein the motor has an outer diameter of 30 millimeters or less.

16. The power tool of claim 13, wherein the crown is biased by a spring.

17. The power tool of claim 13, further comprising a charging connector.

18. The power tool of claim 13, further comprising a printed circuit board and a controller on the printed circuit board.

19. The power tool of claim 18, wherein the motor is between the battery cell and the tool output member.

* * * * *